United States Patent
Secker

[11] Patent Number: 5,952,925
[45] Date of Patent: Sep. 14, 1999

[54] COLLAR FOR A CAT FOR WARNING A BIRD OF THE PRESENCE OF THE CAT

[76] Inventor: Gordon P. Secker, 78 Woodland Dr., Mastic Beach, N.Y. 11951

[21] Appl. No.: 09/085,581

[22] Filed: May 28, 1998

[51] Int. Cl.$^6$ .................................................. G08B 23/00
[52] U.S. Cl. ..................... 340/573.2; 119/859; 340/384.2
[58] Field of Search ............................. 340/573.2, 573.3, 340/384.2; 119/859

[56] References Cited

U.S. PATENT DOCUMENTS

| | | | |
|---|---|---|---|
| 3,336,530 | 8/1967 | Sloan et al. | 340/573 |
| 3,683,113 | 8/1972 | Stewart | 340/384.2 X |
| 3,935,443 | 1/1976 | Simmons | 362/108 |
| 3,944,803 | 3/1976 | Chao | 362/108 |
| 4,173,201 | 11/1979 | Chao et al. | 119/859 |
| 4,284,845 | 8/1981 | Belcher | 340/384.2 |
| 4,725,993 | 2/1988 | Owen et al. | 340/384.2 X |
| 4,876,674 | 10/1989 | Parmely et al. | 340/573.3 X |
| 5,067,441 | 11/1991 | Weinstein | 119/721 |
| 5,575,242 | 11/1996 | Davis et al. | 340/573.3 X |
| 5,818,354 | 10/1998 | Gentry | 340/573 X |

FOREIGN PATENT DOCUMENTS 04485   8/1986   WIPO ................. 340/384.2

Primary Examiner—Thomas Mullen
Attorney, Agent, or Firm—Richard L. Miller, P.E.

[57] ABSTRACT

A collar for wearing by a cat and for warning a bird of the presence of the cat that includes a strap for wearing around the neck of the cat, and an electric device disposed on the strap. An electronic circuit of the electric device includes first, second, third, and fourth pairs of dip switches, a speaker, a volume control in electrical communication with the speaker, a frequency generator in electrical communication with the volume control through an electronic switch and the first pair of dip switches. The first pair of dip switches adjust the frequency of the carrier wave generated by the frequency generator. The electronic circuit further includes a microprocessor that processes input from the second, third, and fourth pairs of dip switches and is in electrical communication with the electronic switch, and the second, third, and fourth pairs of dip switches. The electronic circuit further includes a light level detector in electrical communication with the microprocessor through a light detector switch. The electronic circuit further includes a power supply in electrical communication with the microprocessor through a power switch. The electronic circuit produces a wave form that has a pulse width, a separation between pulses, and a period. The pulse width is adjusted by the second pair of dip switches, the separation between pulses of the wave form is adjusted by the third pair of dip switches, and the period of the wave form is adjusted by the fourth pair of dip switches.

18 Claims, 1 Drawing Sheet

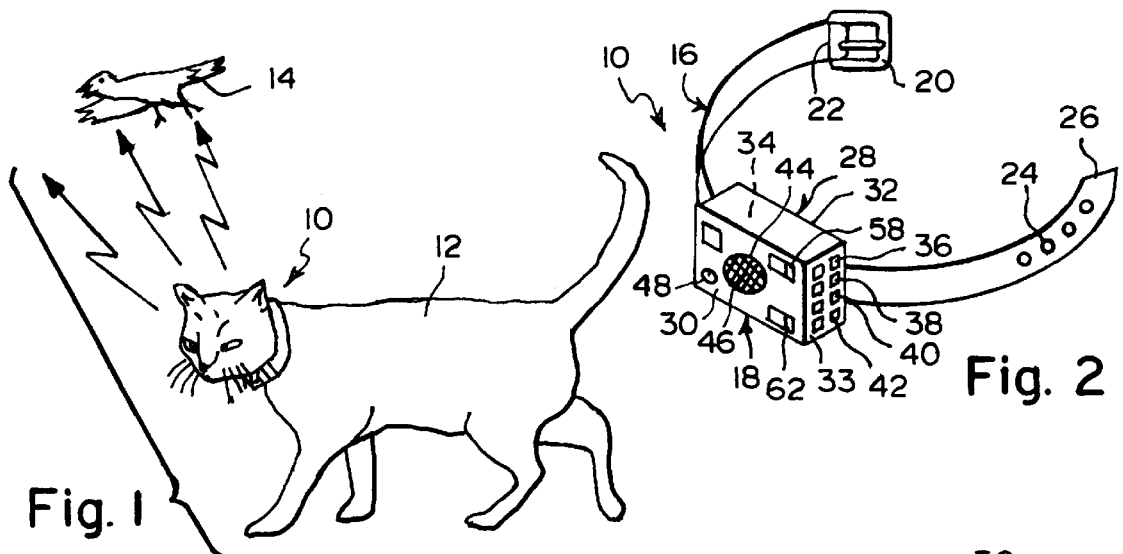
Fig. 1
Fig. 2
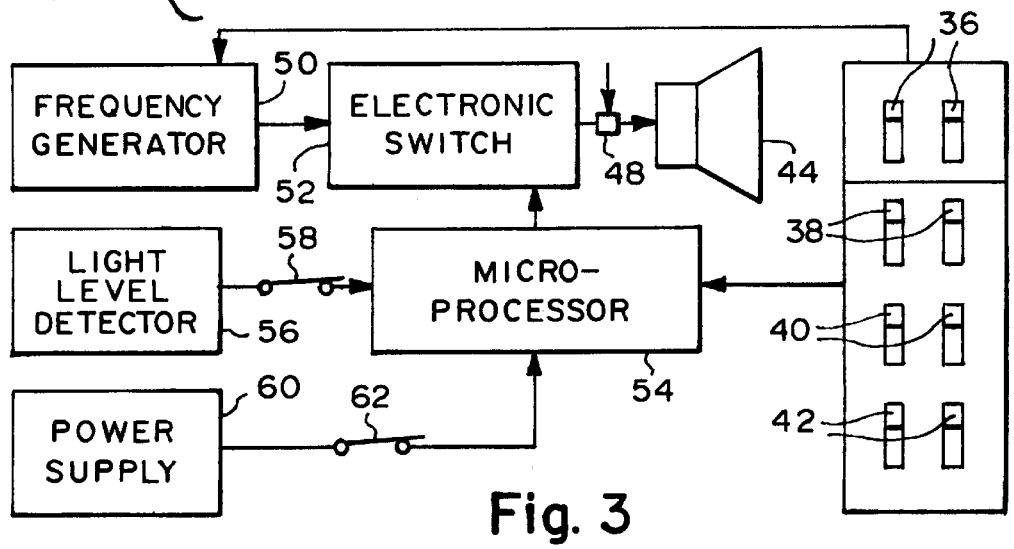
Fig. 3
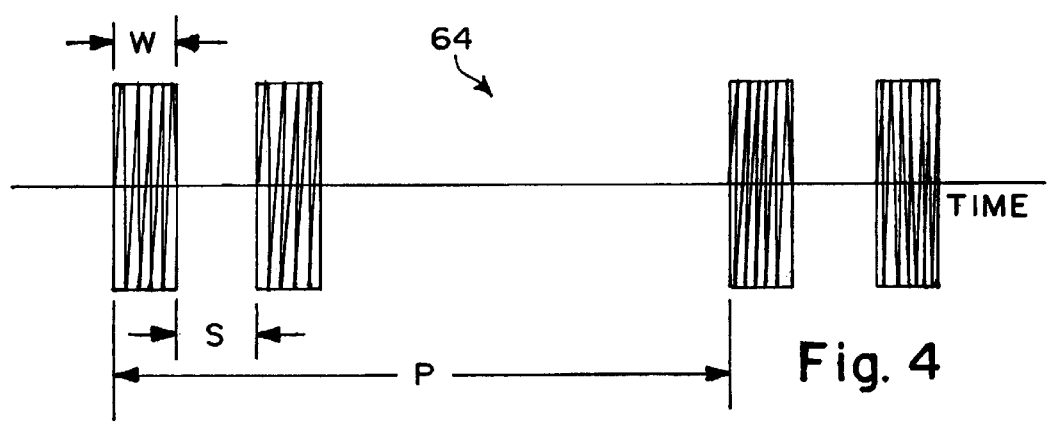
Fig. 4

COLLAR FOR A CAT FOR WARNING A BIRD OF THE PRESENCE OF THE CAT

BACKGROUND OF THE INVENTION

1. Field of the Invention

The present invention relates to a collar for a cat. More particularly, the present invention relates to a collar for a cat for warning a bird of the presence of the cat.

2. Description of the Prior Art

Numerous innovations for pet related devices have been provided in the prior art that will be described. Even though these innovations may be suitable for the specific individual purposes to which they address, however, they differ from the present invention.

FOR EXAMPLE, U.S. Pat. No. 3,935,443 to Simmons teaches an animal collar of translucent plastic material including a plurality of electric lamps secured along a predetermined length of the collar including a battery circuit means for supplying electric energy to the lamps. A translucent leash having spaced lamps therein and terminating at one end in a battery equipped supply handle and a snap means for engaging a ring on the collar. An alternate form of collar shows a lamp source of illumination connected to a plurality of translucent tubing of various lengths, containing light transmitting optical fiberglass filaments for radiating light from the collar including a connection for a battery energy supply.

ANOTHER EXAMPLE, U.S. Pat. No. 3,944,803 to Chao teaches an illuminated safety device worn on the collar of a pet or a belt of a person at night time enabling a driver of an automobile to observe the person or animal. The safety device comprises a lantern tape communicating with a power source, wherein the lantern tape and power source are affixed to the belt or collar. The lantern tape comprises a plurality of colored light bulbs sealed between two transparent flexible plastic strips. The electrical circuit can be designed for continuous illumination or a flashing of the light bulbs.

STILL ANOTHER EXAMPLE, U.S. Pat. No. 4,173,201 to Chao et al. teaches a collar for being worn by a dog, cat or other domesticated pet; the collar including a row of small electric lamps studded around the collar, so as to be visible in darkness or subdued daylight; the circuitry including a replaceable dry cell battery and a manually operated switch mounted on the collar.

FINALLY, YET ANOTHER EXAMPLE, U.S. Pat. No. 5,067,441 to Weinstein teaches an animal restraining system that includes a radio frequency transmitter adapted to be located adjacent an area in which the animal is to be restrained, a transmitting antenna, and a collar unit worn by the animal. The collar unit has a multiplicity of radio signal receivers each having a highly directional receiving antenna with the receiving antennas of the multiplicity of receivers having their axes of maximum sensitivity oriented in different directions, and an analyzer for determining a composite of the field strengths of the radio signals received by the receiving antennas, and detecting when the composite field strength at the receiving antennas falls below predetermined values. When the detected composite field strength falls below a first predetermined value, a first warning signal is generated to the animal, and a second and different warning signal is generated when the composite field strength falls below a second predetermined value.

It is apparent that numerous innovations for pet related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a collar for a cat for warning a bird of the presence of the cat that avoids the disadvantages of the prior art.

ANOTHER OBJECT of the present invention is to provide a collar for a cat for warning a bird of the presence of the cat that is simple and inexpensive to manufacture.

STILL ANOTHER OBJECT of the present invention is to provide a collar for a cat for warning a bird of the presence of the cat that is simple to use.

BRIEFLY STATED, YET ANOTHER OBJECT of the present invention is to provide a collar for wearing by a cat and for warning a bird of the presence of the cat that includes a strap for wearing around the neck of the cat, and an electric device disposed on the strap. An electronic circuit of the electric device includes first, second, third, and fourth pairs of dip switches, a speaker, a volume control in electrical communication with the speaker, a frequency generator in electrical communication with the volume control through an electronic switch and the first pair of dip switches. The first pair of dip switches adjust the frequency of the carrier wave generated by the frequency generator. The electronic circuit further includes a microprocessor that processes input from the second, third, and fourth pairs of dip switches and is in electrical communication with the electronic switch, and the second, third, and fourth pairs of dip switches. The electronic circuit further includes a light level detector in electrical communication with the microprocessor through a light detector switch. The electronic circuit further includes a power supply in electrical communication with the microprocessor through a power switch. The electronic circuit produces a wave form that has a pulse width, a separation between pulses, and a period. The pulse width is adjusted by the second pair of dip switches, the separation between pulses of the wave form is adjusted by the third pair of dip switches, and the period of the wave form is adjusted by the fourth pair of dip switches.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention worn by a cat and warning a bird of the presence of the cat;

FIG. 2 is a diagrammatic perspective view of the present invention;

FIG. 3 is block diagram of the circuit of the present invention; and

FIG. 4 is wave diagram of the audio output from the circuit of the present invention shown in FIG. 3.

LIST OF REFERENCE NUMERALS UTILIZED IN THE DRAWING 10 collar for a cat for warning a bird of the presence of the cat of the present invention 12 cat
14 bird
16 strap for wearing around neck of cat 12
18 electric device
20 buckle affixed to one free end 22 of strap 16
22 free end of strap 16
24 throughbores in other free end 26 of strap 16
26 other free end 26 of strap 16
28 box of electric device 18
30 front wall of box 28 of electric device 18
32 rear wall of box 28 of electric device 18
33 side wall of box 28 of electric device 18
34 electronic circuit contained in box 28 of electric device 18
36 first pair of dip switches of electronic circuit 34 of electric device 18
38 second pair of dip switches of electronic circuit 34 of electric device 18
40 third pair of dip switches of electronic circuit 34 of electric device 18
42 fourth pair of dip switches of electronic circuit 34 of electric device 18
44 speaker of electronic circuit 34 of electric device 18
46 approximate center of front wall 30 of box 28 of electric device 18
48 volume control of electronic circuit 34 of electric device 18
50 frequency generator of electronic circuit 34 of electric device 18
52 electronic switch of electronic circuit 34 of electric device 18
54 microprocessor of electronic circuit 34 of electric device 18
56 light level detector of electronic circuit 34 of electric device 18
58 light detector switch of electronic circuit 34 of electric device 18
60 power supply of electronic circuit 34 of electric device 18
62 power switch of electronic circuit 34 of electric device 18
64 wave form produced by electronic circuit 34 of electric device 18
W pulse width of wave form 64 produced by electronic circuit 34 of electric device 18
S separation between pulses of wave form 64 produced by electronic circuit 34 of electric device 18
P period of wave form 64 produced by electronic circuit 34 of electric device 18

DETAILED DESCRIPTION OF THE PREFERRED EMBODIMENT

Referring now to the figures, in which like numerals indicate like parts, and particularly to FIG. 1, the collar for a cat for warning a bird of the presence of the cat of the present invention is shown generally at 10 for wearing by a cat 12 and for warning a bird 14 of the presence of the cat 12.

The configuration of the collar for a cat for warning a bird of the presence of the cat 10 can best be seen in FIG. 2, and as such, will be discussed with reference thereto.

The collar for a cat for warning a bird of the presence of the cat 10 comprises a strap 16 for wearing around the neck of the cat 12, and an electric device 18 that is disposed on the strap 16.

The strap 16 is elongated and slender, and is selectively maintained around the neck of the cat 12, by a buckle 20 affixed to one free end 22 that cooperates with throughbores 24 in the other free end 26 of the strap 16.

The electric device 18 comprises a box 28 that is hollow and attached to the strap 16, at a position generally midway between the one free end 22 of the strap 16 and the other free end 26 of the strap for allowing the box 28 of the electric device 18 to be worn under the chin of the cat 12.

The box 28 of the electric device 18 has a front wall 30, a rear wall 32 that is spaced behind the front wall 30 of the box 28 of the electric device 18 and attached to the strap 16, and a side wall 33 that extends from the front wall 30 of the box 28 of the electric device 18 to the rear wall 32 of the box 28 of the electric device 18, and contains an electronic circuit 34.

The configuration of the electronic circuit 34 of the electric device 18, its relationship to the box 28 of the electric device 18, and the audio wave form it produces can best be seen in FIGS. 2–4, and as such, will be discussed with reference thereto.

The electronic circuit 34 of the electric device 18 comprises a first pair of dip switches 36 that are recessed in, which prevents the cat 12 from accessing them, and accessible from, the side wall 33 of the box 28 of the electric device 18.

The electronic circuit 34 of the electric device 18 further comprises a second pair of dip switches 38 that are recessed in, which prevents the cat 12 from accessing them, and accessible from, the side wall 33 of the box 28 of the electric device 18, and are disposed below the first pair of dip switches 36 of the electronic circuit 34 of the electric device 18.

The electronic circuit 34 of the electric device 18 further comprises a third pair of dip switches 40 that are recessed in, which prevents the cat 12 from accessing them, and accessible from, the side wall 33 of the box 28 of the electric device 18, and are disposed below the second pair of dip switches 38 of the electronic circuit 34 of the electric device 18.

The electronic circuit 34 of the electric device 18 further comprises a fourth pair of dip switches 42 that are recessed in, which prevents the cat 12 from accessing them, and accessible from, the side wall 33 of the box 28 of the electric device 18, and are disposed below the third pair of dip switches 40 of the electronic circuit 34 of the electric device 18.

The electronic circuit 34 of the electric device 18 further comprises a speaker 44 that is disposed on the front wall 30 of the box 28 of the electric device 18, at its approximate center 46.

The electronic circuit 34 of the electric device 18 further comprises a volume control 48 that is of the screw driver type and recessed in, which prevents the cat 12 from accessing it, and accessible from, the front wall 30 of the box 28 of the electric device 18, and is disposed to one side of, and in electrical communication with, the speaker 44 of the electronic circuit 34 of the electric device 18.

The electronic circuit 34 of the electric device 18 further comprises a frequency generator 50 that generates a carrier wave with a frequency, and is contained in the box 28 of the electric device 18, and is in electrical communication with the volume control 48 of the electronic circuit 34 of the electric device 18, through an electronic switch 52, and with the first pair of dip switches 36 of the electronic circuit 34 of the electric device 18.

The first pair of dip switches 36 of the electronic circuit; 34 of the electric device 18 adjust the frequency of the carrier wave generated by the frequency generator 50 of the electronic circuit 34 of the electric device 18, with typically one frequency being 10,000 cycles/sec., another being 20,000 cycles/sec., another being 30,000 cycles/sec., and finally another being 40,000 cycles/sec.

The electronic circuit 34 of the electric device 18 further comprises a microprocessor 54 that processes input from the second pair of dip switches 38 of the electronic circuit 34 of the electric device 18, the third pair of dip switches 40 of the electronic circuit 34 of the electric device 18, and the fourth pair of dip switches 42 of the electronic circuit 34 of the electric device 18.

The microprocessor 54 of the electronic circuit 34 of the electric device 18 is contained in the box 28 of the electric device 18, and is in electrical communication with the electronic switch 52 of the electronic circuit 34 of the electric device 18, the second pair of dip switches 38 of the electronic circuit 34 of the electric device 18, the third pair of dip switches 40 of the electronic circuit 34 of the electric device 18, and the fourth pair of dip switches 42 of the electronic circuit 34 of the electric device 18.

The electronic circuit 34 of the electric device 18 further comprises a light level detector 56 that renders the collar for a cat for warning a bird of the presence of the cat 10 inoperative when there is not enough light.

The light level detector 56 of the electronic circuit 34 of the electric device 18 is disposed on the front wall 30 of the box 28 of the electric device 18, above the volume control 48 of the electronic circuit 34 of the electric device 18.

The light level detector 56 of the electronic circuit 34 of the electric device 18 is in electrical communication with the microprocessor 54 of the electronic circuit 34 of the electric device 18 through a light detector switch 58 that is recessed in, which prevents the cat 12 from accessing it, and accessible from, the front wall 30 of the box 28 of the electric device 18, and is disposed to the other side of the speaker 44 of the electronic circuit 34 of the electric device 18, with the light detector switch 58 of the electronic circuit 34 of the electric device 18 selectively operating the light level detector 56 of the electronic circuit 34 of the electric device 18.

The electronic circuit 34 of the electric device 18 further comprises a power supply 60 that is contained in the box 28 of the electric device 18, and is in electrical communication with the microprocessor 54 of the electronic circuit 34 of the electric device 18, through a power switch 62 that is recessed in, which prevents the cat 12 from accessing it, and accessible from, the front wall 30 of the box 28 of the electric device 18, and is disposed below the light detector switch 58 of the electronic circuit 34 of the electric device 18.

The electronic circuit 34 of the electric device 18 produces a wave form 64 that has a pulse width W, a separation between pulses S, and a period P.

The pulse width W of the wave form 64 is adjusted by the second pair of dip switches 38 of the electronic circuit 34 of the electric device 18, with typically one time being 1 sec., another time being 2 sec., another time being 4 sec., and finally another time being 8 sec.

The separation between pulses S of the wave form 64 is adjusted by the third pair of dip switches 40 of the electronic circuit 34 of the electric device 18, with typically one time being 0.5 sec., another time being 1 sec., another time being 2 sec., and finally another time being 4 sec.

The period P of the wave form 64 is adjusted by the fourth pair of dip switches 42 of the electronic circuit 34 of the electric device 18, with typically one time being 0.25 min., another time being 0.5 min., another time being 1 min., and finally another time being 2 min.

Initially, the first pair of dip switches 36 of the electronic circuit 34 of the electric device 18 are set to adjust the frequency of the carrier wave generated by the frequency generator 50 to 10,000 cycles/sec., which is audible by the human ear and thereby allows the pulse width W of the wave form 64, the separation between pulses S of the wave form 64, and the period P of the wave form 64 to be set as desired.

Subsequently thereto, the first pair of dip switches 36 of the electronic circuit 34 of the electric device 18 is set to adjust the frequency of the carrier wave generated by the frequency generator 50 to either 20,000 cycles/sec., 30,000 cycles/sec., or 40,000 cycles/sec., which are only audible to the bird 14.

It will be understood that each of the elements described above, or two or more together, may also find a useful application in other types of constructions differing from the types described above.

While the invention has been illustrated and described as embodied in a collar for a cat for warning a bird of the presence of the cat, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A collar for wearing by a cat and for warning a bird of the presence of the cat, comprising:
   a) a strap for wearing around the neck of the cat; said strap being elongated and slender, and being selectively maintained around the neck of the cat, by a buckle affixed to one free end of said strap cooperating with throughbores in the other free end of said strap; and
   b) an electric device disposed on said strap; said electric device comprising a box being hollow and attached to said strap, at a position generally midway between said one free end of said strap and said other free end of said strap for allowing said box of said electric device to be worn under the chin of the cat; said box of said electric device having a front wall, a rear wall being spaced behind said front wall of said box of said electric device and attached to said strap, and a side wall extending from said front wall of said box of said electric device to said rear wall of said box of said electric device, and containing an electronic circuit; said electronic circuit of said electric device comprising a first pair of dip switches being recessed in, which prevents the cat from accessing them, and accessible from, said side wall of said box of said electric device.

2. The collar as defined in claim 1, wherein said electronic circuit of said electric device further comprises a second pair of dip switches that are recessed in, which prevents the cat from accessing them, and accessible from, said side wall of said box of said electric device, and are disposed below said first pair of dip switches of said electronic circuit of said electric device.

3. The collar as defined in claim 2, wherein said electronic circuit of said electric device further comprises a third pair of dip switches that are recessed in, which prevents the cat from accessing them, and accessible from, said side wall of said box of said electric device, and are disposed below said second pair of dip switches of said electronic circuit of said electric device.

4. The collar as defined in claim 3, wherein said electronic circuit of said electric device further comprises a fourth pair of dip switches that are recessed in, which prevents the cat from accessing them, and accessible from, said side wall of said box of said electric device, and are disposed below said third pair of dip switches of said electronic circuit of said electric device.

5. The collar as defined in claim 4, wherein said electronic circuit of said electric device further comprises a speaker that is disposed on said front wall of said box of said electric device, at its approximate center.

6. The collar as defined in claim 5, wherein said electronic circuit of said electric device further comprises a volume control that is recessed in, which prevents the cat from accessing it, and accessible from, said front wall of said box of said electric device, and is disposed to one side of, and in electrical communication with, said speaker of said electronic circuit of said electric device.

7. The collar as defined in claim 6, wherein said electronic circuit of said electric device further comprises a frequency generator that generates a carrier wave with a frequency, and is contained in said box of said electric device, and is in electrical communication with said volume control of said electronic circuit of said electric device, through an electronic switch, and with said first pair of dip switches of said electronic circuit of said electric device.

8. The collar as defined in claim 7, wherein said first pair of dip switches of said electronic circuit of said electric device adjust said frequency of said carrier wave generated by said frequency generator of said electronic circuit of said electric device, with said frequency being one of 10,000 cycles/sec., 20,000 cycles/sec., 30,000 cycles/sec., and 40,000 cycles/sec.

9. The collar as defined in claim 7, wherein said electronic circuit of said electric device further comprises a microprocessor that processes input from said second pair of dip switches of said electronic circuit of said electric device, said third pair of dip switches of said electronic circuit of said electric device, and said fourth pair of dip switches of said electronic circuit of said electric device.

10. The collar as defined in claim 9, wherein said microprocessor of said electronic circuit of said electric device is contained in said box of said electric device, and is in electrical communication with said electronic switch of said electronic circuit of said electric device, said second pair of dip switches of said electronic circuit of said electric device, said third pair of dip switches of said electronic circuit of said electric device, and said fourth pair of dip switches of said electronic circuit of said electric device.

11. The collar as defined in claim 9, wherein said electronic circuit of said electric device further comprises a light level detector that renders said collar for a cat for warning a bird of said presence of said cat inoperative when there is not enough light.

12. The collar as defined in claim 11, wherein said light level detector of said electronic circuit of said electric device is disposed on said front wall of said box of said electric device, above said volume control of said electronic circuit of said electric device.

13. The collar as defined in claim 11, wherein said light level detector of said electronic circuit of said electric device is in electrical communication with said microprocessor of said electronic circuit of said electric device through a light detector switch that is recessed in, which prevents the cat from accessing it, and accessible from, said front wall of said box of said electric device, and is disposed to the other side of said speaker of said electronic circuit of said electric device, with said light detector switch of said electronic circuit of said electric device selectively operating said light level detector of said electronic circuit of said electric device.

14. The collar as defined in claim 13, wherein said electronic circuit of said electric device further comprises a power supply that is contained in said box of said electric device, and is in electrical communication with said microprocessor of said electronic circuit of said electric device, through a power switch that is recessed in, which prevents the cat from accessing it, and accessible from, said front wall of said box of said electric device, and is disposed below said light detector switch of said electronic circuit of said electric device.

15. The collar as defined in claim 4, wherein said electronic circuit of said electric device produces a wave form that has a pulse width, a separation between pulses, and a period.

16. The collar as defined in claim 15, wherein said pulse width of said wave form is adjusted by said second pair of dip switches of said electronic circuit of said electric device, with time being one of 1 sec., 2 sec., 4 sec., and 8 sec.

17. The collar as defined in claim 15, wherein said separation between pulses of said wave form is adjusted by said third pair of dip switches of said electronic circuit of said electric device, with time being one of 0.5 sec., 1 sec., 2 sec., and 4 sec.

18. The collar as defined in claim 15, wherein said period of said wave form is adjusted by said fourth pair of dip switches of said electronic circuit of said electric device, with time being one of 0.25 min., 0.5 min., 1 min., and 2 min.

* * * * *